(12) United States Patent
Vogel et al.

(10) Patent No.: US 7,395,793 B2
(45) Date of Patent: Jul. 8, 2008

(54) IGNITION SYSTEM FOR AN INTERNAL COMBUSTION ENGINE

(75) Inventors: Manfred Vogel, Ditzingen (DE); Gernot Wuerfel, Vaihingen/Enz (DE); Axel Heinstein, Wimsheim (DE); Klaus-Peter Gansert, Vaihingen/Enz (DE); Axel Storch, Moeglingen (DE); Roman Grzeszik, Dransfeld (DE); Klaus Ries-Mueller, Bad Rappenau (DE); Detlev Nowak, Heilbronn (DE); Stefan Lauter, Asperg (DE); Robert Koehler, Liebenzell/Monakam (DE); Paulo Ricardo, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/351,089

(22) Filed: Feb. 9, 2006

(65) Prior Publication Data

US 2006/0180120 A1 Aug. 17, 2006

(30) Foreign Application Priority Data

Feb. 11, 2005 (DE) .................... 10 2005 006 354

(51) Int. Cl.
*F02P 1/00* (2006.01)
*F02B 5/00* (2006.01)

(52) U.S. Cl. .................. 123/169 EL; 123/169 MG; 123/305

(58) Field of Classification Search ........... 123/169 EL, 123/169 MG, 146.5, 298, 305; 313/140, 313/141, 123
See application file for complete search history.

(56) References Cited

U.S. PATENT DOCUMENTS

| | | | | |
|---|---|---|---|---|
| 4,219,001 A | * | 8/1980 | Kumagai et al. | 123/169 EL |
| 4,700,103 A | * | 10/1987 | Yamaguchi et al. | 313/141 |
| 5,315,982 A | * | 5/1994 | Ward et al. | 123/634 |
| 5,347,855 A | * | 9/1994 | Miyata et al. | 73/116 |
| 5,347,856 A | * | 9/1994 | Miyata et al. | 73/116 |
| 5,581,145 A | * | 12/1996 | Kato et al. | 313/141 |
| 5,797,383 A | * | 8/1998 | Matsubara et al. | 123/594 |
| 6,095,124 A | * | 8/2000 | Matsubara et al. | 123/594 |
| 6,225,752 B1 | * | 5/2001 | Matsubara et al. | 315/209 M |
| 6,617,706 B2 | * | 9/2003 | Matsubara et al. | 307/10.1 |
| 6,644,267 B2 | * | 11/2003 | Wuerfel | 123/298 |
| 6,724,133 B2 | * | 4/2004 | Miyashita et al. | 313/143 |
| 6,832,588 B2 | * | 12/2004 | Herden et al. | 123/193.3 |
| 6,871,630 B2 | * | 3/2005 | Herden et al. | 123/297 |
| 2001/0017125 A1 | * | 8/2001 | Matsubara et al. | 123/310 |
| 2002/0079800 A1 | * | 6/2002 | Miyashita et al. | 313/143 |
| 2003/0085643 A1 | * | 5/2003 | Matsubara | 313/141 |
| 2005/0224043 A1 | * | 10/2005 | Vogel et al. | 123/297 |

FOREIGN PATENT DOCUMENTS

DE 198 04 463 8/1999

* cited by examiner

*Primary Examiner*—John T Kwon
(74) *Attorney, Agent, or Firm*—Michael J. Striker

(57) ABSTRACT

An ignition system for an internal combustion engine, having a combustion chamber and a fuel injection device which injects a fuel directly into the combustion chamber in stream-guided fashion, is configured so that the ignition system has a positive polarity.

4 Claims, 2 Drawing Sheets

Fig. 2
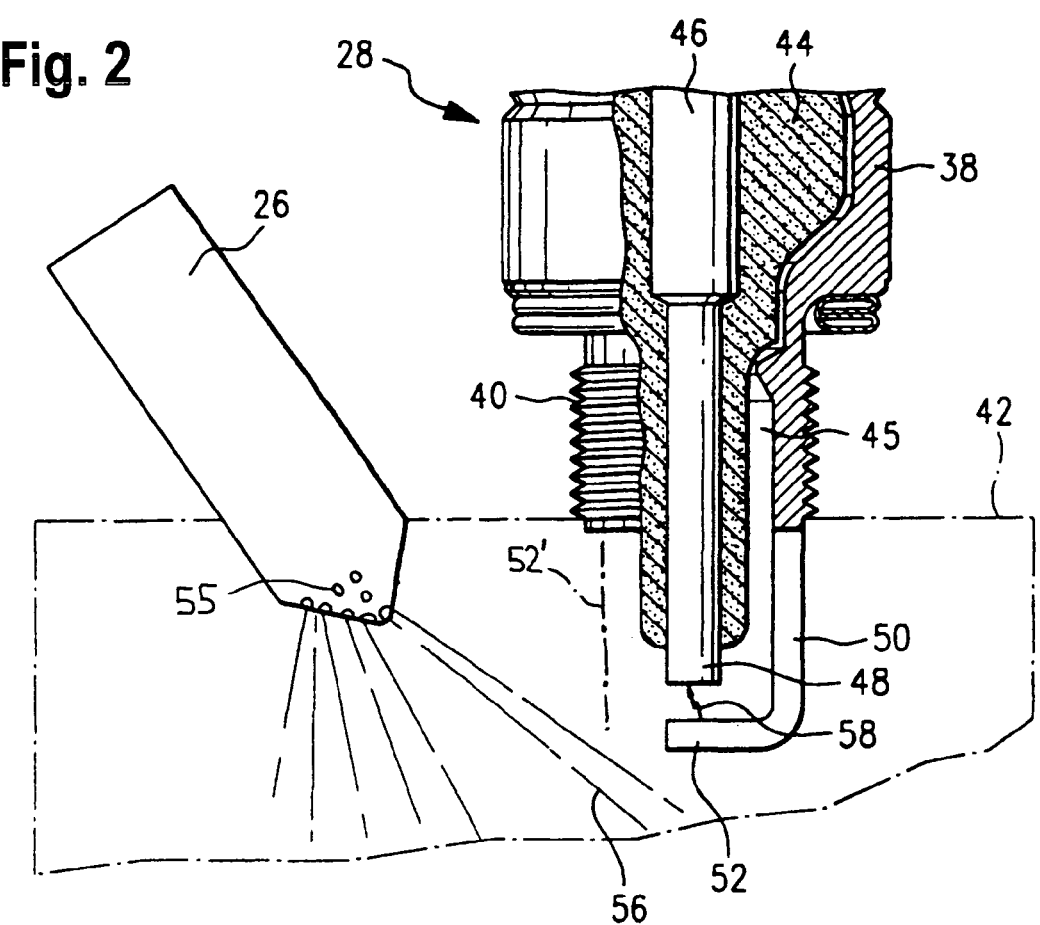
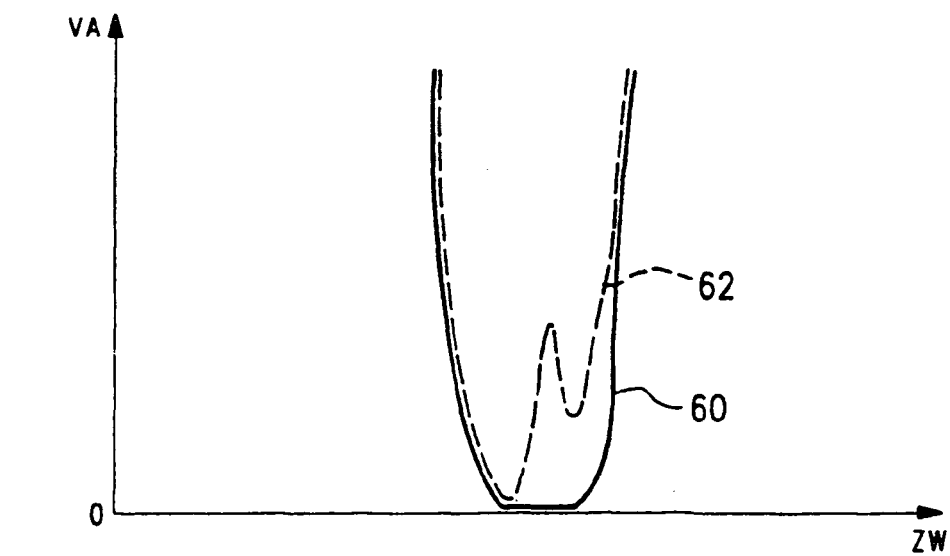
Fig. 3

IGNITION SYSTEM FOR AN INTERNAL COMBUSTION ENGINE

BACKGROUND OF THE INVENTION

The invention relates to an ignition system for an internal combustion engine having a combustion chamber and having a fuel injection device, which injects the fuel directly into the combustion chamber in a stream-guided fashion; at least one spark plug is connected to the ignition system and has a middle electrode and at least one ground electrode and ignites the injected fuel.

An ignition system of the type defined at the outset is known from German Patent Disclosure DE 198 04 463. This reference shows a fuel injection device which injects the fuel directly into a combustion chamber formed by a cylinder/piston construction. A spark plug protrudes into the combustion chamber. By means of a targeted injection of fuel by means of the fuel injection device with at least one stream, a stream-guided combustion process is implemented by the formation of a corresponding cloud of fuel mixture. In the known stream-guided combustion process, the fuel mixture cloud required for combustion is formed solely by the injection. It is then especially important that the fuel stream and the location of the ignition spark at the spark plug be positioned with extreme precision relative to one another. Only then is good reliability of ignition assured.

SUMMARY OF THE INVENTION

The object of the present invention is to refine an ignition system of the type defined at the outset such that the reliability of ignition is as high as possible.

In keeping with these objects and with others which will become apparent hereinafter, one feature of the present invention resides, briefly stated, in an ignition system for an internal combustion engine having a combustion chamber and a fuel injection device which injects a fuel directly into the combustion chamber in stream-guided fashion, wherein the ignition system is configured so that the ignition system has a positive polarity.

Another feature of the present invention resides, briefly stated, in an internal combustion engine, comprising a combustion chamber; a fuel injection device which injects a fuel directly into said combustion chamber in stream-guided fashion; and an ignition system, wherein said ignition system is configured so that it has a positive polarity.

Still a further feature of the present invention resides, briefly stated, in a method for operating an ignition system for an internal combustion engine having a combustion chamber and a fuel injection device which injects a fuel directly into the combustion chamber, the method comprising the steps of providing the ignition system with a positive polarity.

In an ignition system with positive polarity, the ignition spark jumps from at least one ground electrode to the middle electrode. Because of the electrical conductivity of soot deposited on an insulator of the spark plug, it can happen, as has been found according to the invention, in ignition systems of negative polarity that the location where the ignition spark forms is shifted. In particular, it can happen that the ignition spark shifts into the breathing room of the spark plug.

Such a shift can reduce the reliability of ignition, especially in a stream-guided combustion process. The reason for this is that the ignition spark is then no longer located in the optimally ignitable mixture region. Moreover, the ignition voltage, which with such a shifted ignition spark is increased, leads to a shortened spark duration, which additionally impairs the reliability of ignition. A shifted ignition spark also gives up part of its thermal energy to an insulator of the spark plug, for instance, so that less energy is available for ignition, which again impairs the reliability of ignition.

All these disadvantages are overcome in the internal combustion engine of the invention, since it has been found that in an ignition system with positive polarity, a shift of the ignition spark does not occur, or occurs to only a slight extent. Thus a high reliability of ignition is assured over a long period of time. At the same time, in the stream guidance of the fuel by the fuel injection device, fewer tolerances have to be taken into account, which makes a more-precise mixture formation in the combustion chamber possible, with a more-favorable emissions performance by the engine.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view, partly in section and enlarged, of the spark plug and the fuel injection device of FIG. 1; and FIG. 3 is a graph in which the number of combustion misfires are plotted over the ignition angle in the operation of the engine of FIG. 1.

DESCRIPTION OF THE PREFERRED EMBODIMENTS

Figure 1:
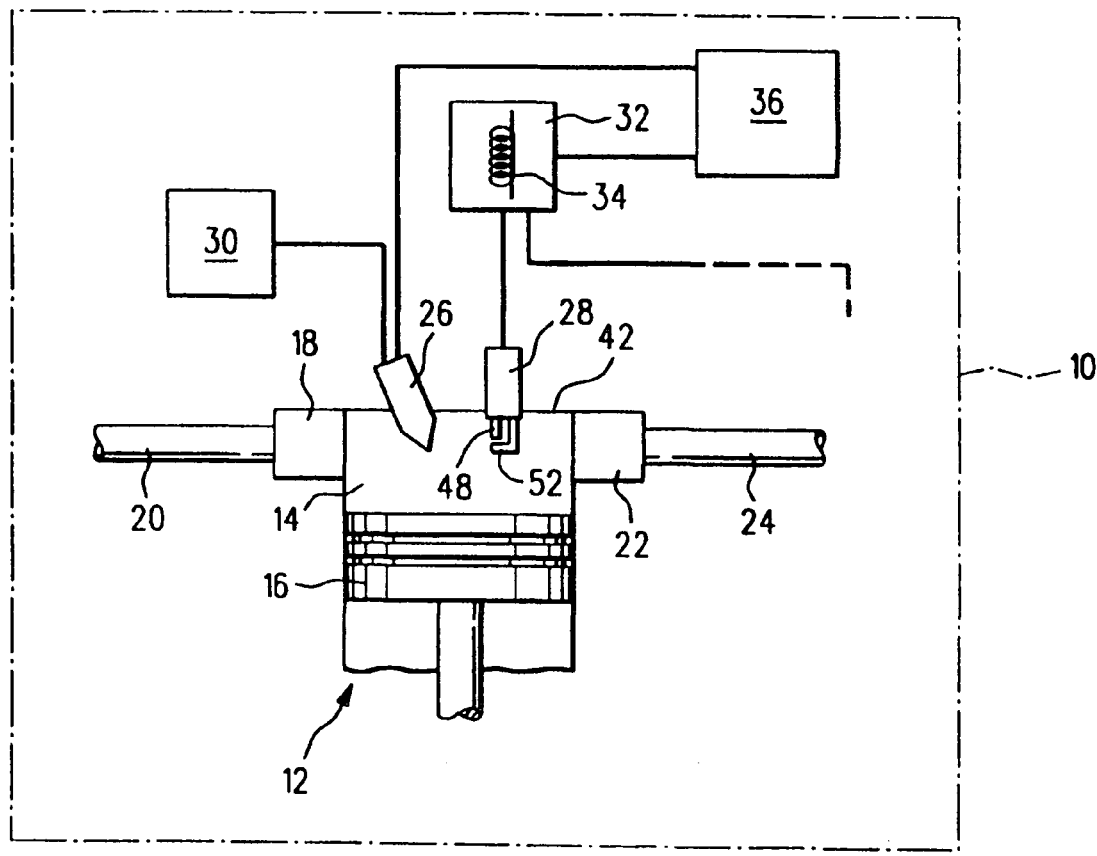
FIG. 1 is a schematic illustration of an internal combustion engine with an ignition system, a spark plug, and a fuel injection device.

An internal combustion engine is represented in FIG. 1 only by a dot-dashed line and is identified overall by reference numeral 10. It serves to drive a motor vehicle, not shown in FIG. 1, and includes a plurality of cylinders, of which only one is shown in the drawing, represented by reference numeral 12.

The cylinder 12 includes a combustion chamber 14 and a piston 16. Via an inlet valve 18, fresh air reaches the combustion chamber 14 from an intake tube 20. Combustion exhaust gases are carried out of the combustion chamber 14 into an exhaust pipe 24 via an outlet valve 22.

The fuel is delivered to the combustion chamber 14 directly via a fuel injection device 26, which injects the fuel directly into the combustion chamber 14 in a manner to be described further hereinafter. The fuel-air mixture present in the combustion chamber 14 is ignited by a spark plug 28, which will also be described in greater detail hereinafter.

The fuel injection device 26 is connected to a high-pressure fuel system 30, which among other elements includes a high-pressure fuel pump, not shown, and a fuel rail. The spark plug 28 is connected to an ignition system 32, which among other elements includes an ignition coil 34. The operation of the fuel injection device 26, like that of the ignition system 32, is controlled and regulated by a control and regulating unit 36.

As FIG. 2 shows, the spark plug 28 includes a tubular metal housing 38. There is a thread 40 on the housing, by way of which the spark plug 28 is screwed into a cylinder head 42 of the engine 10. An insulator 44 coaxial with the housing 38 is retained in the housing and protrudes past the housing 38 and into the combustion chamber 14 in the manner of a peg. At the level of the thread 40, between the housing 38 and the insulator 44, which is typically made from a ceramic material, there is an annular chamber 45, which is also known as a "breathing room" and serves to cool the spark plug.

In the insulator 44, again coaxially with it, there is a metal, electrically conductive middle conductor 46, which protrudes toward the combustion chamber 14 somewhat past the insulator 44 and forms a middle electrode 48 there. A rodlike ground conductor 50 extending into the combustion chamber 14 parallel to the middle conductor 48 is welded onto the edge of the housing 38 that in the installed position faces toward the combustion chamber 14; this ground conductor is bent over toward the middle electrode 48, approximately at the axial level of that electrode, at an angle of 90° and forms a ground electrode 52 there. In alternative exemplary embodiment, shown only schematically in FIG. 2, a plurality of ground electrodes 52 and 52' are distributed in the circumferential direction of the middle electrode 48 and are embodied differently from one another.

The fuel injection device 26 is embodied such that the mixture preparation in operation of the engine 10 takes place in "stream-guided" fashion in the combustion chamber 14. The mixture cloud required for combustion is formed here solely by the injection. To that end, the fuel injection device 26 has a plurality of fuel outlet openings 55 ("injection ports"). As FIG. 2 shows, a plurality of injection streams 56 are sprayed just past the spark plug 28, so that finally, only vaporized fuel arrives at the spark plug 28. In this way, a charge stratification can be created inside the combustion chamber 14, without a significant deposition of fuel onto the walls of the combustion chamber 14.

For reliable ignition of the injected fuel, the location where the spark plug 28 furnishes the ignition spark (reference numeral 58 in FIG. 2) is very important. This location should be constant, both during a combustion cycle ("working cycle") and from one combustion cycle to another. To achieve this, the ignition system 32 has a positive polarity. This means that the middle electrode 48 is the anode. This kind of positive polarity of the ignition system 32 prevents the location where the ignition spark 58 is present from shifting from the position shown in FIG. 2 into the breathing room 45. If the polarity were different, such shifting could happen because of depositions of soot on the insulator 44 that occur in operation.

The effect of the positive polarity of the ignition system 32 becomes especially clear when the graph in FIG. 3 is assessed: In this graph, VA represents the frequency of combustion misfires in operation of the engine 10, while ZW stands for the ignition angle. The curve identified by reference numeral 60 describes the conditions for the engine 10 shown in FIGS. 1 and 2, whose ignition system 32 has a positive polarity. It can be seen that in a certain range of the ignition angle ZW, no combustion misfires VA whatever occur.

A corresponding curve for an ignition system with negative polarity is shown in dashed lines in FIG. 3 and identified by reference numeral 62. It can be seen that in this case, the range of the ignition angle ZW in which no combustion misfires VA occur is minimal, but still markedly narrower than in the case of the curve 60. In other words, if an ignition system of positive polarity is used, the ignition angle range in which uniform combustion prevails is markedly wider than if an ignition system of negative polarity is used.

It will be understood that each of the elements described above, or two or more together, may also find a useful application in other types of constructions and methods differing from the types described above.

While the invention has been illustrated and described as embodied in an ignition system for an internal combustion engine, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. An ignition system for an internal combustion engine having a combustion chamber and a fuel injection device which injects the fuel directly into the combustion chamber in stream-guided fashion with formation of a mixture cloud formed by an injection and required for combustion, wherein the ignition system is configured so that the ignition system has a positive polarity and generates ignition sparks after the positive polarity was established to impede a shift of the ignition sparks, wherein a spark plug is provided and includes an insulator, an electrically conductive middle conductor which protrudes past the insulator towards the combustion chamber and forms a middle electrode, and at least one rod-like ground conductor extending into the combustion chamber substantially parallel to the middle electrode and bent toward the middle electrode.

2. An internal combustion engine, comprising a combustion chamber; a fuel injection device which injects a fuel directly into said combustion chamber in stream-guided fashion with formation of a mixture cloud formed by an injection and required for combustion; and an ignition system, said ignition system being configured so that it has a positive polarity and generates ignition sparks after the positive polarity was established to impede a shift of the ignition sparks, wherein a spark plug is provided and includes an insulator, an electrically conductive middle conductor which protrudes past the insulator towards the combustion chamber and forms a middle electrode, and at least one rod-like ground conductor extending into the combustion chamber substantially parallel to the middle electrode and bent toward the middle electrode.

3. A method of operating an ignition system for an internal combustion engine having a combustion chamber and a fuel injection device, comprising the steps of injecting a fuel by the fuel injection device directly into the combustion chamber in stream-guided fashion with formation of a mixture cloud formed by an injection and required for combustion; providing the ignition system with a positive polarity; and connecting to the ignition system a spark plug which includes an insulator, an electrically conductive middle conductor which protrudes past the insulator towards the combustion chamber and forms a middle electrode, and at least one rod-like ground conductor extending into the combustion chamber substantially parallel to the middle electrode and bent toward the middle electrode; and generating ignition sparks by the ignition system after the positive polarity was established to impede a shift of the ignition sparks.

4. A method of operating an ignition system for an internal combustion engine having a combustion chamber and a fuel injection device, comprising the steps of injecting a fuel by the fuel injection device directly into the combustion chamber in stream-guided fashion with formation of a mixture cloud formed by an injection and required for combustion; providing the ignition system with a positive polarity; and connecting to the ignition system a spark plug which includes an insulator, an electrically conductive middle conductor which protrudes past the insulator towards the combustion chamber and forms a middle electrode, and at least one rod-like ground conductor extending into the combustion chamber substantially parallel to the middle electrode and bent toward the middle electrode; generating ignition sparks by the ignition system after the positive polarity was established, with generating a plurality of ignition sparks succeeding one another directly per working cycle; and maintaining the positive polarity during the generation of the plurality of ignition sparks succeeding one another directly per working cycle to impede a shift of the ignition sparks.

* * * * *